United States Patent
Osada

(10) Patent No.: US 11,057,533 B1
(45) Date of Patent: Jul. 6, 2021

(54) IMAGE FORMING APPARATUS AND IMAGE FORMING METHOD FOR INFERRING AND RESPONDING TO TARGET OPERATOR SITUATION

(71) Applicant: KYOCERA Document Solutions Inc., Osaka (JP)

(72) Inventor: Yoshihiro Osada, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/836,504

(22) Filed: Mar. 31, 2020

(51) Int. Cl.
*H04N 1/00* (2006.01)
*G06K 9/00* (2006.01)

(52) U.S. Cl.
CPC ..... *H04N 1/00437* (2013.01); *G06K 9/00362* (2013.01); *H04N 1/00403* (2013.01)

(58) Field of Classification Search
None
See application file for complete search history.

(56) References Cited

U.S. PATENT DOCUMENTS

| | | | | |
|---|---|---|---|---|
| 6,035,074 A * | 3/2000 | Fujimoto | ............ | G06K 9/00228 382/118 |
| 6,976,032 B1 * | 12/2005 | Hull | ........................ | G06Q 10/10 |
| 7,460,692 B2 | 12/2008 | Mizutani et al. | | |
| 8,688,579 B1 * | 4/2014 | Ethington | ............ | G06K 9/4609 705/42 |
| 9,213,815 B2 | 12/2015 | Nishii | | |
| 9,232,082 B2 | 1/2016 | Fukushima | | |
| 10,019,136 B1 * | 7/2018 | Ozog | .................... | H04N 21/466 |
| 10,027,727 B1 * | 7/2018 | Ozog | .................. | G06K 9/00288 |
| 10,182,179 B2 * | 1/2019 | Kosaka | .................. | G06F 3/1267 |
| 10,212,310 B2 | 2/2019 | Kanai et al. | | |
| 10,289,362 B2 | 5/2019 | Miyaji | | |
| 2004/0156535 A1 * | 8/2004 | Goldberg | ............ | H04N 1/00172 382/115 |
| 2006/0056666 A1 | 3/2006 | Mizutani et al. | | |
| 2006/0115108 A1 * | 6/2006 | Rodriguez | ............ | G06T 1/0021 382/100 |
| 2007/0115363 A1 * | 5/2007 | Nakamura | .......... | H04N 5/23218 348/208.14 |

(Continued)

FOREIGN PATENT DOCUMENTS

JP 2006-081147 A 3/2006

*Primary Examiner* — Anh-Vinh T Nguyen
(74) *Attorney, Agent, or Firm* — Hawaii Patent Services; Nathaniel K. Fedde; Kenton N. Fedde

(57) ABSTRACT

Provided is an image forming apparatus capable of improving operability. A recognizing unit recognizes surroundings of the image forming apparatus itself from image data captured by the image capturing unit. An additional information collecting unit collects additional information that possibly is associated with the target operator recognized by the recognizing unit. A situation inferring unit infers a situation of the image forming apparatus itself from recognition information recognized by the recognizing unit. At this time, the situation inferring unit may infer a situation of a target operator from additional information collected by the additional information collecting unit, and recognition information of the target operator. A response unit changes a response and/or an operation corresponding to the situation inferred by the situation inferring unit.

17 Claims, 5 Drawing Sheets

(56) References Cited

U.S. PATENT DOCUMENTS

| | | | |
|---|---|---|---|
| 2008/0267456 A1* | 10/2008 | Anderson | G06F 3/04886 382/115 |
| 2009/0051941 A1* | 2/2009 | Goh | H04N 1/32101 358/1.4 |
| 2009/0148006 A1* | 6/2009 | Hayasaki | H04N 1/32767 382/118 |
| 2010/0141800 A1* | 6/2010 | Katayama | H04N 5/2353 348/240.1 |
| 2011/0034176 A1* | 2/2011 | Lord | G06K 9/6253 455/450 |
| 2011/0234779 A1* | 9/2011 | Weisberg | H04N 1/00132 348/61 |
| 2014/0105466 A1* | 4/2014 | Botes | H04N 1/00336 382/118 |
| 2016/0086186 A1* | 3/2016 | Candelore | G06K 9/0004 705/44 |
| 2017/0208213 A1* | 7/2017 | Miyoshi | G03G 21/04 |
| 2018/0220042 A1* | 8/2018 | Kosaka | H04N 1/32101 |
| 2018/0367656 A1* | 12/2018 | Kim | G06F 21/32 |
| 2019/0098258 A1* | 3/2019 | Kushido | H04N 5/23203 |
| 2020/0298574 A1* | 9/2020 | Takabayashi | B41J 29/13 |
| 2020/0311393 A1* | 10/2020 | Kutsuzawa | H04N 1/00437 |

* cited by examiner

IMAGE FORMING APPARATUS AND IMAGE FORMING METHOD FOR INFERRING AND RESPONDING TO TARGET OPERATOR SITUATION

BACKGROUND

The present disclosure relates to an image forming apparatus and an image forming method, and particularly to an image forming apparatus and an image forming method for recognizing a target operator.

Conventionally, there are image forming apparatuses such as multifunctional peripherals (MFP) and the like capable of printing a document or an image.

In the typical technology, image forming apparatuses are disclosed that have a feature of being provided with a camera for capturing an image of an operator, a face data storage unit, an authenticating unit, and a control unit. The face data storage unit registers face data indicating the face of an operator in advance. The authenticating unit authenticates whether or not face data indicating the face of an operator belongs to a registered operator based on the result of searching the face data registered in the face data storage unit. In a case where, based on the authentication result by the authenticating unit, the control unit determines that the face data is not that of a registered operator, the control unit controls only specified functions that may be executed by a non-registered operator.

SUMMARY

An image forming apparatus according to the present disclosure includes: a recognizing unit configured to recognize surroundings of the image forming apparatus itself from captured image data; a situation inferring unit configured to infer a situation of the image forming apparatus itself from recognition information recognized by the recognizing unit; and a response unit configured to change a response and/or an operation corresponding to the situation inferred by the situation inferring unit.

An image forming method according to the present disclosure is an image forming method that is executed by an image forming apparatus comprising the steps of: in the image forming apparatus, performing recognition of surroundings of the image forming apparatus itself from captured image data; inferring a situation of the image forming apparatus itself from recognized recognition information; and performing a change of a response and/or an operation corresponding to the inferred situation.

A non-transitory computer-readable recording medium according to the present disclosure includes instructions that is executed by an image forming apparatus, and the instructions including the steps of in the image forming apparatus, performing recognition of surroundings of the image forming apparatus itself from captured image data; inferring a situation of the image forming apparatus itself from recognized recognition information; and performing a change of a response and/or an operation corresponding to the inferred situation.

DETAILED DESCRIPTION

Embodiments

[Overall System Configuration of an Image Forming Apparatus 1]

Figure 1:
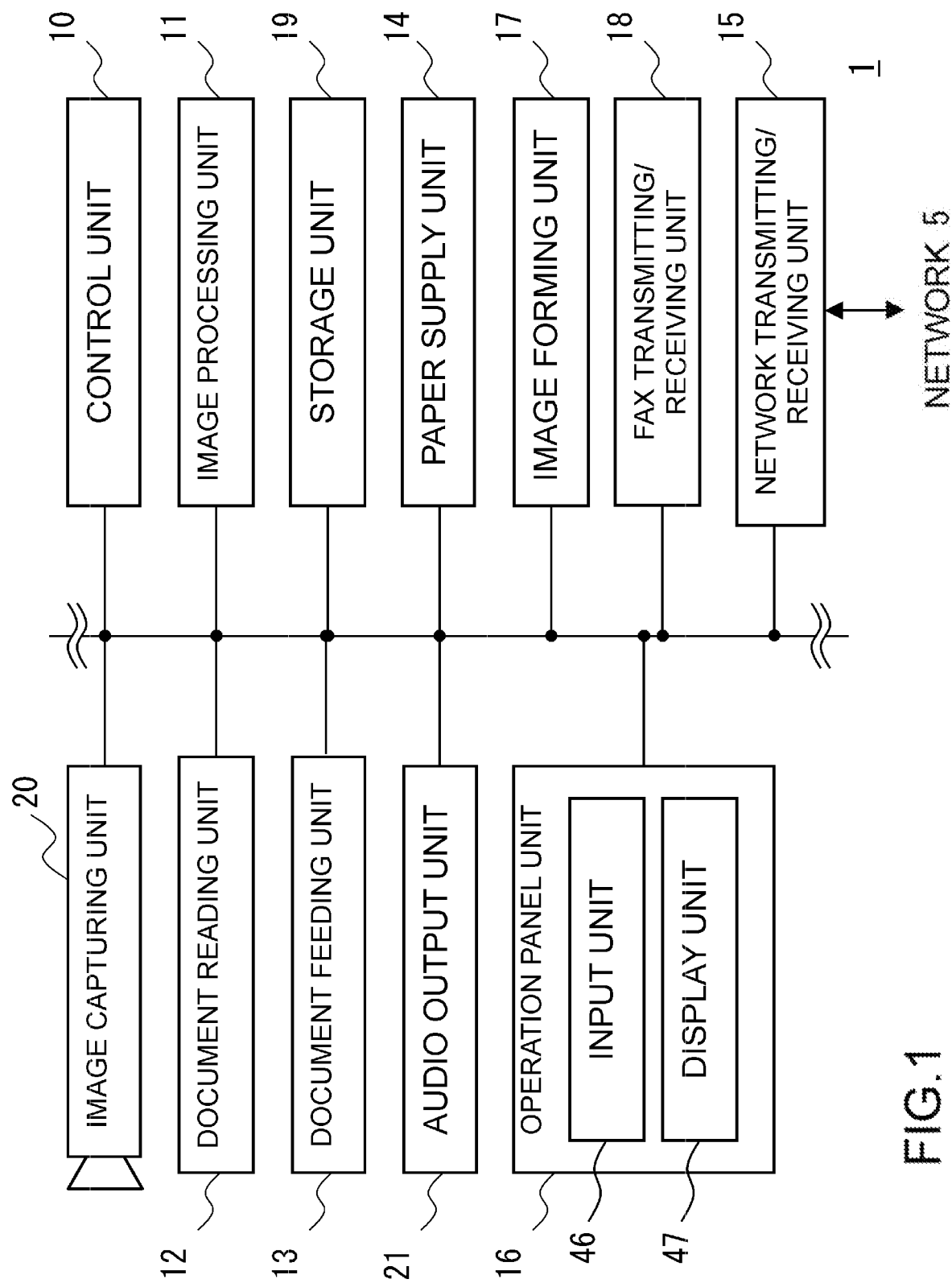
FIG. 1 is a system configuration diagram of an embodiment of an image forming apparatus according to the present disclosure.

First, an overall system configuration of an image forming apparatus 1 will be described with reference to FIG. 1.

The image forming apparatus 1 includes: a control unit 10, an image processing unit 11, a document reading unit 12, a document feeding unit 13, a paper supply unit 14, a network transmitting/receiving unit 15, an operation panel unit 16, an image forming unit 17 (image forming means), a FAX transmitting/receiving unit 18, a storage unit 19, an image capturing unit 20, an audio output unit 21, and the like. Each unit is connected to the control unit 10 and the operation is controlled by the control unit 10.

The control unit 10 is an information processing unit such as a general purpose processor (GPP), a central processing unit (CPU), a micro processing unit (MPU), a digital signal processor (DSP), a graphics processing unit (GPU), an application specific integrated circuit (ASIC, application specific processor) or the like.

The control unit 10 reads a control program stored in the ROM or the HDD of the storage unit 19 and expands the control program in the RAM, and then by executing the control program, operates as each unit of a function block described later. In addition, the control unit 10 performs overall control of the apparatus according to specified instruction information that is inputted from an external terminal or the operation panel unit 16.

The image processing unit 11 is an information processing unit such as a digital signal processor (DSP), a graphics processing unit (GPU) or the like. The image processing unit 11 performs specified image processing on the image data 200. The image processing unit 11 performs various image processing such as enlargement/reduction, density adjustment, gradation adjustment, image improvement and the like.

The image processing unit 11 stores an image that is read by the document reading unit 12 in the storage unit 19 as print data. At this time, the image processing unit 11 is also able to convert the print data into file units having format such as PDF, TIFF or the like.

In the present embodiment, the image processing unit 11 has a function of a so-called artificial intelligence (AI) accelerator such as a convolutional neural network or the like. This accelerator is able to execute, for example, a high-speed operation of an AI-learned model, or execute learning itself at high speed and with low power consumption.

The document reading unit 12 reads a set document. In addition, the document reading unit 12 is provided above the main body of the image forming apparatus 1.

The document reading unit 12 includes a scanner, a platen glass, and a document reading slit. In a case of reading a document placed on the platen glass, the document reading unit 12 moves the scanner to a position facing the platen glass and reads the document placed on the platen glass while scanning the document to acquires image data, then outputs the acquired image data to the control unit 10.

Moreover, in a case of reading an document that is fed from the document feeding unit 13, the document reading unit 12 moves the scanner to a position facing the document reading slit. Then, the document reading unit 12 reads the document via the document reading slit in synchronization with the document conveying operation of the document feeding unit 13 and acquires image data. The document reading unit 12 outputs the acquired image data to the control unit 10.

The document feeding unit 13 conveys a document that is to be read by the document reading unit 12. The document feeding unit 13 is arranged above the document reading unit 12.

The document feeding unit 13 includes a document placement unit and a document conveying mechanism. The document feeding unit 13 sequentially feeds out documents placed on the document placement unit one by one by the document conveying mechanism and feeds the documents to the document reading unit 12.

The paper supply unit 14 feeds out sheets of recording paper one by one toward the image forming unit 17. The paper supply unit 14 is provided in the main body.

The network transmitting/receiving unit 15 is a network connecting unit that includes a LAN board, a wireless transceiver, or the like for connecting to an external network. The external network according to the present embodiment is, for example, a LAN, a wireless LAN, a WAN, a mobile telephone network, a voice telephone network, or the like.

The network transmitting/receiving unit 15 transmits or receives data via a data communication line, and transmits or receives an audio signal via a voice telephone line.

The operation panel unit 16 is a means that acquires a user instruction and displays the state or the like of the image forming apparatus 1. In other words, the operation panel unit 16 configures an interface between the image forming apparatus 1 and a user.

The configuration of the operation panel unit 16 will be described later.

The image forming unit 17, according to an output instruction from a user, forms an image on recording paper from data stored in the storage unit 19, read by the document reading unit 12 or obtained from an external terminal.

The image forming unit 17 includes a photosensitive drum, an exposing unit, a developing unit, a transfer unit, a fixing unit, and the like. The image forming unit 17 records a toner image on recording paper by executing an image forming process that includes charging, exposure, development, transfer, and fixing.

The FAX transmitting/receiving unit 18 performs facsimile transmission or reception. The FAX transmitting/receiving unit 18 is capable of receiving facsimile data from another FAX apparatus via a voice line, store the facsimile data in the storage unit 19, and cause the image forming unit 17 to form an image. In addition, the FAX transmitting/receiving unit 18 is able to convert the document read by the document reading unit 12 or the network FAX data transmitted from an external terminal into image data 200 and transmit the image data 200 to another FAX apparatus via a voice line.

The storage unit 19 is a non-transitory recording medium such as a semiconductor memory such as a read only memory (ROM) and a random access memory (RAM), a hard disk drive (HDD), or the like.

The storage contents of the RAM of the storage unit 19 are retained by a function such as self-refresh or the like even in the power saving state.

A control program for performing control of the operation of the image forming apparatus 1 is stored in the ROM or the HDD of the storage unit 19. In addition to this, the storage unit 19 also stores user account settings.

In the present embodiment, the storage unit 19 stores a job received from a terminal such as an external PC, a smartphone, or the like, or from a server, or received by FAX. This job, for example, is a document file described in page description language (PDL), other document data, image data 200, and the like.

Furthermore, the storage unit 19 also stores information of an AI model. In addition, the storage unit 19 may store status information, operation history information (log), and the like of the image forming apparatus 1.

Note that the storage unit 19 may include a storage folder (document box) area for each user.

The image capturing unit 20 is a camera that captures an image around the image forming apparatus 1. The image capturing unit 20, for example, is a camera that includes an imaging element such as a charge-coupled device image sensor (CCD), a complementary MOS image sensor (CMOS) and the like, and an optical member such as a lens, LED lighting and the like. The image capturing unit 20 outputs the captured image data 200 (refer to FIG. 2) to the storage unit 19.

In the present embodiment, the image capturing unit 20 is connected to the main unit or the operation panel unit 16 of the image forming apparatus 1 by, for example, a universal serial bus (USB).

The audio output unit 21 reproduces and synthesizes audio data, performs digital to analog (D/A) conversion, and outputs the result as an audio signal. The audio signal is outputted as audio output from a speaker, an earphone output terminal, or the like.

Furthermore, the operation panel unit 16 includes an input unit 46 and a display unit 47.

The input unit 46 is a touch panel, switches (buttons), or the like for acquiring various instructions from a user. In a case where the touch panel is compatible with multi-touch, the input unit 46 may detect a plurality of positions. The switches, for example, acquire instructions related, for example, to a start key, numeric keypad, switching the operation mode, printing, transmitting, or receiving of a selected document, or the like. It is possible to switch modes such as "copy", "scan", "save document box", "FAX transmission" or the like for example as the operating mode.

Furthermore, in the present embodiment, the input unit 46 is able to acquire an instruction for performing settings of the own apparatus. For this purpose, for example, dedicated switches such as "setting" or the like, and setting buttons or the like on a touch panel are provided.

The display unit 47 is a flat display panel such as an liquid-crystal display (LCD), an organic electro-luminescence (OEL) display, a field emission display (FED), a fluorescent display tube or the like, a projector, a status display LED or the like.

The display unit 47 displays a menu corresponding to a graphical user interface (GUI) for allowing a user to input various instructions. This menu is configured by various operation screens, icons, characters, images, and the like. In addition, the menu also displays the status of the image forming apparatus 1, various setting values and the like.

In addition, the operation panel unit 16 may be provided with a USB terminal to which a USB memory, a portable terminal and the like may be connected, a memory card reader for connecting an external recording medium such as a flash memory card and the like, a reader for reading an ID card, a biometric authentication reader for reading a biometric signal, and the like. Of these, the ID card is a magnetic card, a contact or non-contact IC card, or the like for identification (ID) authentication of a user including a target operator. The biological signal includes, for example, image data such as a fingerprint, veins of a finger or a palm, an iris and the like.

Note that in the image forming apparatus 1, the control unit 10 and the image processing unit 11 may be integrally formed like a CPU built-in GPU or the like, or a chip-on-module package.

In addition, the control unit 10 and the image processing unit 11 may include a RAM, a ROM, a flash memory, or the like.

[Functional Configuration of the Image Forming Apparatus 1]

Figure 2:
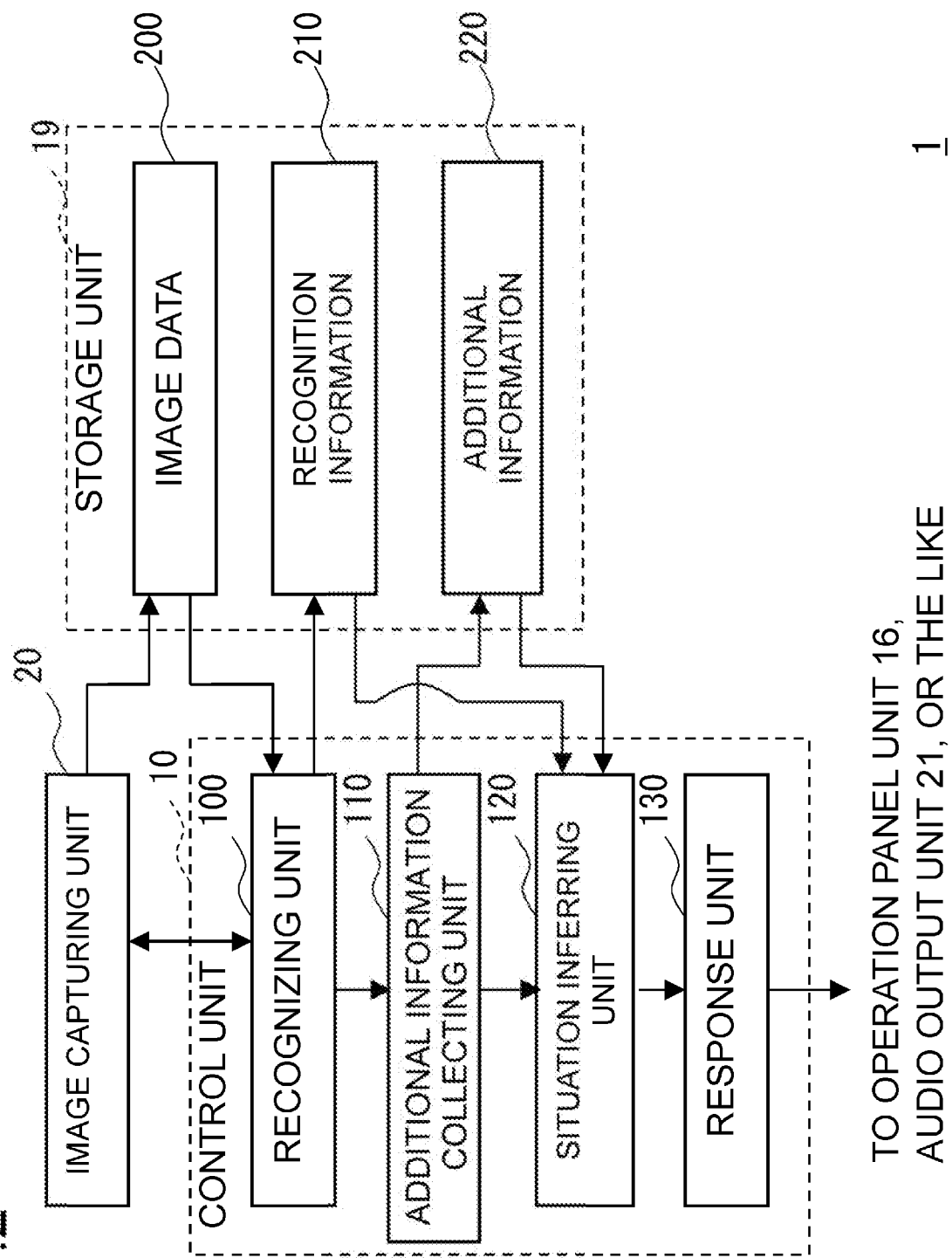
FIG. 2 is a block diagram illustrating a functional configuration of the image forming apparatus illustrated in FIG. 1.

Here, a functional configuration of the image forming apparatus 1 will be described with reference to FIG. 2.

The control unit 10 of the image forming apparatus 1 includes a recognizing unit 100, an additional information collecting unit 110, a situation inferring unit 120, and a response unit 130.

The storage unit 19 stores image data 200, recognition information 210, and additional information 220.

The recognizing unit 100 performs recognition of a person, an object, or the like around the image forming apparatus 1 itself from the image data 200 captured by the image capturing unit 20, and stores a recognition result in the storage unit 19 as recognition information 210. In the present embodiment, an example will be described in which a person recognized from the image data 200 is a user that operates the image forming apparatus 1 and is inferred to be a target for performing a response described later. In the present embodiment, this person is referred to as a "target operator".

The recognizing unit 100 is able to perform high-speed real-time image recognition from the image data 200 by using, for example, a convolutional neural network accelerator of the image processing unit 11.

In the present embodiment, the recognizing unit 100 is capable of recognizing operation-related information that is related to operation by the target operator. It is possible to recognize any one or any arbitrary combination or the like of the person, the facial expression, the gestures, the actions, the reactions, the operation frequency, the moving direction, a portable object, and the arrangement order of the target operator, for example, as the operation-related information. Note that in this embodiment, the recognizing unit 100 does not need to identify the user ID of the target operator by face authentication or the like.

The additional information collecting unit 110 collects additional information 220 that possibly is associated with the target operator recognized by the recognizing unit 100.

In the present embodiment, the additional information collecting unit 110 is able to acquire any one or any arbitrary combination of apparatus operation history, job reception information, and option mounting state information as the additional information 220. The additional information collecting unit 110 is able to collect this information from the apparatus information stored in the storage unit 19, or from external terminals, servers, and the like.

The situation inferring unit 120 infers the situation of the target operator according to the recognition information 210 recognized by the recognizing unit 100. At this time, the situation inferring unit 120 is also able to use the additional information 220 collected by the additional information collecting unit 110 to infer the situation.

In the present embodiment, for example, the situation inferring unit 120 infers, for example, an operation that the target operator will want to perform next, from characteristics included in the recognition information 210 of the target operator. At this time, the situation inferring unit 120 is also able to perform inference of a situation correlated with the additional information 220.

The response unit 130 changes a response and/or an operation corresponding to the situation inferred by the situation inferring unit 120.

In the present embodiment, the response unit 130 is able to dynamically change selection options such as a menu or the like displayed on the display unit 47 of the operation panel unit according to the situation. Alternatively, the response unit 130 is able to respond by voice from the audio output unit 21.

The image data 200 is data of a bitmap image captured by the image capturing unit 20. The image data 200 may be, for example, a still image file in a format such as jpg, BMP or the like. Alternatively, the image data 200 may be video data such as mpeg, mjpg (mov) or the like.

The recognition information 210 is information indicating a recognition result of recognition by the recognizing unit 100. For example, the recognition information 210 may include a recognition result of the person, the facial expression, the gesture, the action, the reaction, the operation frequency, the moving direction, the portable object, and the arrangement order of the target operator or the like. More specifically, the recognition information 210 may correlate the output (recognition result) of the output layer of the convolutional neural network, together with the accuracy (recognition certainty), with the coordinates in the image data 200, and store it.

The additional information 220 is information that possibly is associated with the target operator. In other words, the additional information 220 is information that is a clue for inferring the situation of the target operator. For example, as the additional information 220, it is possible to use an apparatus operation history, job reception information, an option mounting state, and the like.

Here, the control unit 10 of the image forming apparatus 1, by executing the control program stored in the storage unit 19, is made to function as the recognizing unit 100, the additional information collecting unit 110, the situation inferring unit 120, and the response unit 130.

In addition, each unit of the image forming apparatus 1 described above becomes a hardware resource for executing the image forming method according to the present disclosure.

Note that a part or any arbitrary combination of the above-described functional configurations may be hardware-configured with an IC, programmable logic, an field-programmable gate array (FPGA), or the like.

[Inferred Response Process by the Image Forming Apparatus 1]

Figure 3:
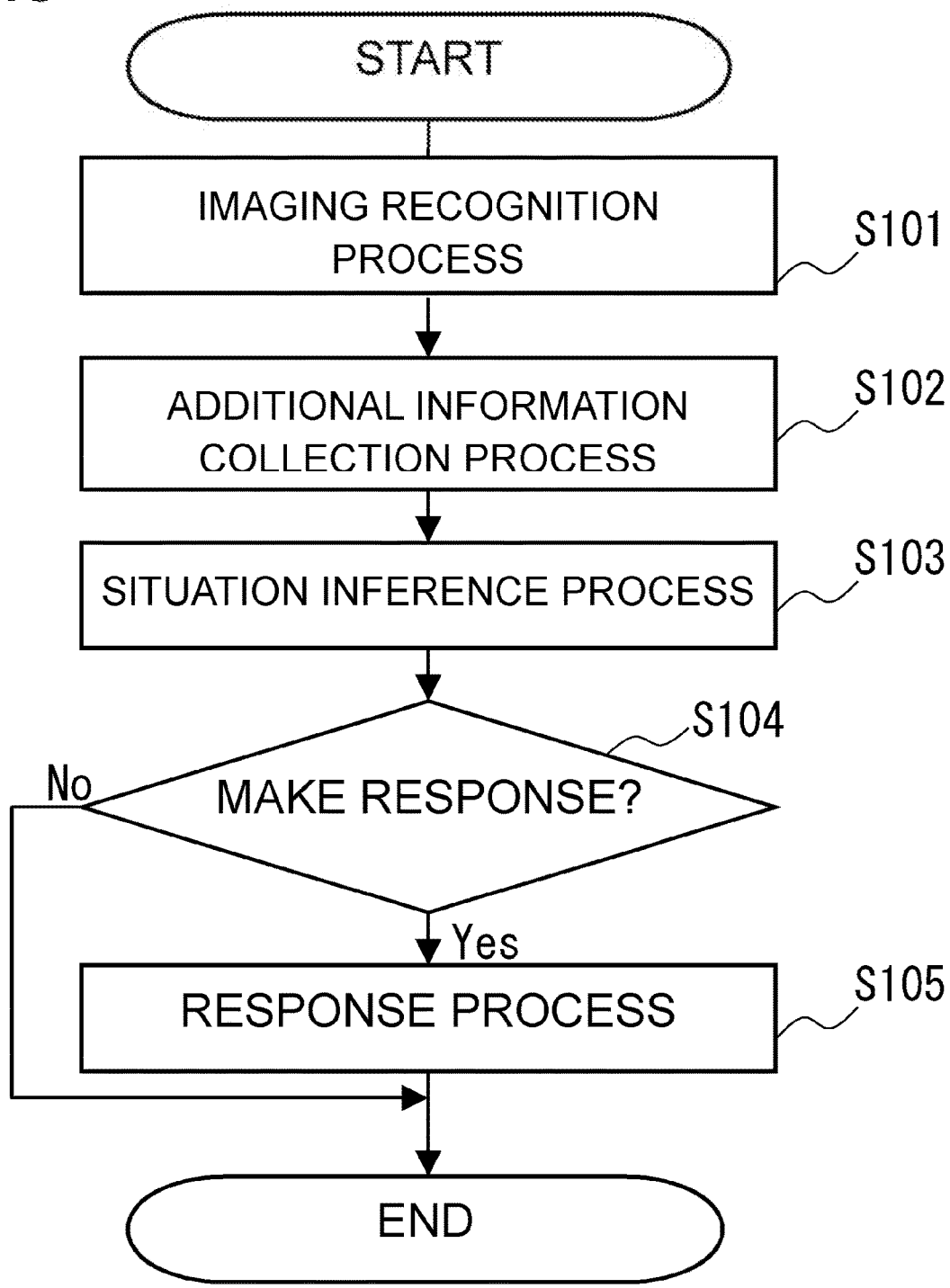
FIG. 3 is a flowchart of an inferred response process of an embodiment according to the present disclosure.

Next, with reference to FIG. 3, a description will be given of an inferred response process by the image forming apparatus 1 of an embodiment according to the present disclosure.

The inferred response process of the present embodiment performs recognition of the target operator from the captured image data 200. At this time, additional information 220 that is associated with the recognized target operator is collected. Then, the state of the target operator is inferred from the collected additional information 220 and the recognition information 210 of the target operator. Then, a response corresponding to the inferred situation is made.

In the inferred response process of the present embodiment, the control unit 10 mainly executes a program stored in the storage unit 19 using hardware resources in cooperation with each unit.

Hereinafter, the details of the inferred response process of the present embodiment will be described for each step with reference to the flowchart of FIG. 3.

(Step S101)

First, the image capturing unit 20 and the recognizing unit 100 perform an imaging recognition process.

The recognizing unit 100 operates the image capturing unit 20 so as to capture an image of the surroundings of the image forming apparatus 1 at a wide angle. The captured image data 200 is stored in the storage unit 19.

Then, the recognizing unit 100 performs image recognition on the image data 200 stored in the storage unit 19. This recognition may be performed using, for example, a convolutional neural network (model) that has already been learned. At this time, it is also possible to use an AI accelerator of the image processing unit 11. Note that the recognizing unit 100 may also learn a convolutional neural network based on a result of a response described later.

The recognizing unit 100 specifically identifies the person that is the target operator. At this time, the recognizing unit 100 does not necessarily perform person recognition in an individual unit capable of recognizing a user ID or the like, such as in the case of face authentication and the like, and it is possible to recognize the characteristics of a person, such as what kind of operation the person often performs and the like.

More specifically, for example, the recognizing unit 100 is able to recognize a person such as a female office worker who frequently performs copying. Furthermore, the recognizing unit 100 is also able to recognize that the target operator has left because the target operator is no longer recognized as the recognized person. Alternatively, the recognizing unit 100 is also able to recognize that the target operator has been replaced or the like.

Alternatively, the recognizing unit 100 is also able to recognize the facial expression and gesture of the target operator. More specifically, for example, the recognizing unit 100 is able to recognize facial expressions and gestures such as the target operator being stiff, troubled, panicked, showing something, performing a characteristic action, searching for something, and the like.

Alternatively, the recognizing unit 100 is also able to recognize operation-related information related to the operation of the target operator. More specifically, for example, the recognizing unit 100 is able to recognize, as operation-related information, characteristics of the actions or reactions of the target operator, including an operation. As the operation, for example, the recognizing unit 100 may be able to recognize actions or reactions such as the target operator attempting to open the top panel, attempting to insert a USB memory or the like into the operation panel unit 16, searching the discharge tray for a recording sheet on which an image has been formed by the image forming unit 17, attempting to feed paper into the feeding tray, attempting to remove paper from the discharge tray, and the like.

Alternatively, the recognizing unit 100 may recognize the operation frequency, the direction of movement, the portable object, and the lined order of the target operator. As the operation frequency, for example, the recognizing unit 100 may recognize whether the operation frequency of the target operator is active or frozen. In other words, it is possible to recognize information that is a clue for inferring a situation such as whether the user is moving around to solve something, hesitating, or simply waiting. Alternatively, the recognizing unit 100 is able to recognize whether the direction of movement is approaching or leaving the image forming apparatus 1. Furthermore, the recognizing unit 100 is able to recognize paper, a notebook, a USB memory, a portable terminal, an ID card, and the like to be copied as portable objects. As the lined order, the recognizing unit 100 is able to recognize, for example, whether the target operator is at the front of the line, whether a person is waiting behind, and the like.

The recognizing unit 100 stores, in the storage unit 19, recognition information 210 that is a result of recognition of these target operators.

(Step S102)

Next, the additional information collecting unit 110 performs an additional information collection process.

The additional information collecting unit 110 collects additional information 220 that possibly is associated with the target operator recognized by the recognizing unit 100. More specifically, the additional information collecting unit 110 may acquire, as the additional information 220, an apparatus operation history, job reception information, and information on an option mounting state. Of these, as the apparatus operation history, it is possible to acquire information from the state information, history information and the like of the storage unit 19 such as the type of job executed, whether the image forming apparatus 1 itself has been accessed, whether the paper cassette is open, whether the top panel is open, whether a document has been set, and the like. Here, access to the image forming apparatus 1 itself includes access to a feeding tray and a discharge tray.

As the job reception information, it is possible, for example, to acquire information from the storage unit 19 such as information indicating whether a job is received from an external terminal, a server, a facsimile, or the like and stored in the storage unit 19.

As the option mounting state, it is possible to acquire information from the storage unit 19 such as information indicating whether or not an optional device such as a tray, a sorter, a stapler, an ID card reader, a biological signal reader, an entrance and exit management device, and the like is mounted in the image forming apparatus 1.

(Step S103)

Next, the situation inferring unit 120 performs a situation inference process. The situation inferring unit 120 reads the recognition information 210 stored in the storage unit 19, and infers the situation of the target operator. At this time, the situation inferring unit 120 is able to infer the situation using also the additional information 220 stored in the storage unit 19.

More specifically, as the situation of the target operator, the situation inferring unit 120 infers, for example, what operation is to be performed for the image forming apparatus 1. In other words, the operation that the target operator wants to perform next is inferred. In order for this, the situation inferring unit 120 is able to infer some situations from characteristics included in the recognition information 210. At this time, the situation inferring unit 120 is able to infer the situation by correlating the recognition information 210 with the additional information 220.

More specifically, the situation inferring unit 120 calculates a score corresponding to a menu displayed on the display unit 47 of the operation panel unit 16 of the image forming apparatus 1 for inferring which instruction is to be inputted as a value of a specific situation of the target operator. This score may be calculated for each function. Furthermore, the situation inferring unit 120 may calculate a score for inferring whether a sub-option to be further displayed will be inputted when there is an instruction inputted on the appearance menu for one function.

(Step S104)

Next, the response unit 130 determines whether or not to respond. In a case where the score of the inference corresponding to any of the above-mentioned instructions is higher than a specific threshold value, the response unit 130 determines that a response is to be made, and determines YES. In other cases, the response unit 130 determines NO.

In the case of YES, the response unit 130 advances the process to step S105.

In the case of NO, the response unit 130 ends the inferred response process.

(Step S105)

In a case where a response is required, the response unit 130 performs a response process.

The response unit 130 changes a response and/or an operation corresponding to the situation inferred by the situation inferring unit 120.

More specifically, in response to an inference of a situation of the target operator, the response unit 130 is able, for example, to dynamically change selection options such as a menu, or the like, respond by voice, and the like.

For example, as a change in the operation, the response unit 130 may temporarily stop or put on hold the image forming apparatus 1 and wait for the next instruction from the target operator.

Alternatively, for example, as a response change, the response unit 130 is able to dynamically change selection options of a menu, thereby simplifying the operation. In other words, by dynamically changing the selection options, it is possible to reach the selection option desired by the user in the shortest time. In this case, the response unit 130 is able to simplify the menu operation by reflecting the changed selection options on the menu while leaving other options that are not definitive. At this time, the response unit 130 may dynamically change the selection options of the menu so as to continuously change the screen or the like without changing the menu arrangement so as not to confuse the target operator.

More specifically, the response unit 130 is able to, for example, perform highlighting to enlarge a part of a menu corresponding to a situation. In other words, the response unit 130 performs an enlarged display, for example, of a portion of the menu where it is inferred according to the score described above that there is a possibility that an instruction will be inputted. At this time, the response unit 130 may perform a reduced display of unimportant portions or the like.

In addition to this, the response unit 130 may display, as a selection option, a shortcut that reduces a plurality of operations to one operation. Furthermore, as a selection option, the response unit 130 may suggest a function that is difficult to reach in a normal menu hierarchy.

Note that at the time of these changes, it is preferable to avoid a change in a display that would confuse the user.

Moreover, as a response change, the response unit 130 is, for example, able to notify the target operator by voice from the audio output unit 21. At this time, the response unit 130 is able to output a notification about the operation of the image forming apparatus 1 or a change in the menu by using a synthesized voice or a recorded voice.

In addition, as a further response change, the response unit 130, according to an instruction from a target operator corresponding to the response, is able to perform control in order to acquire an instruction corresponding to the menu, and restart or stop the operation of the image forming apparatus 1.

More specific examples of these responses will be described below.

This ends the inferred response process of an embodiment according to the present disclosure.

[Specific Example of the Inferred Response Process]

Next, a specific example of recognition, inference, and response of target operator in the inferred response process of the present embodiment will be described with reference to FIG. 4 and FIG. 5.

(Holding Paper)

In addition, for example, the recognizing unit 100 recognizes, from the captured image data 200, that the target operator is holding paper as a portable object and is moving in an approaching direction as the moving direction.

Then, the situation inferring unit 120 infers the situation as to whether or not the target operator wants to make a copy.

On the other hand, the recognizing unit 100 is also able to recognize that the paper is a notebook.

In this case, the situation inferring unit 120 acquires information from the history information, as additional situation, indicating that copying is not often performed and scanning is often performed, and infers the situation.

As a result, the situation inferring unit 120 calculates the possibility of the instruction of the target operator as the above-described score.

At this time, in a case where the recognizing unit 100 recognizes a reaction such as positively providing the paper to the image capturing unit 20 of the image forming apparatus 1 or the like, the situation inferring unit 120 is able to adjust the degree of emphasis in the score.

The response unit 130 reflects this score on the menu and displays the menu on the display unit 47.

Figure 4:
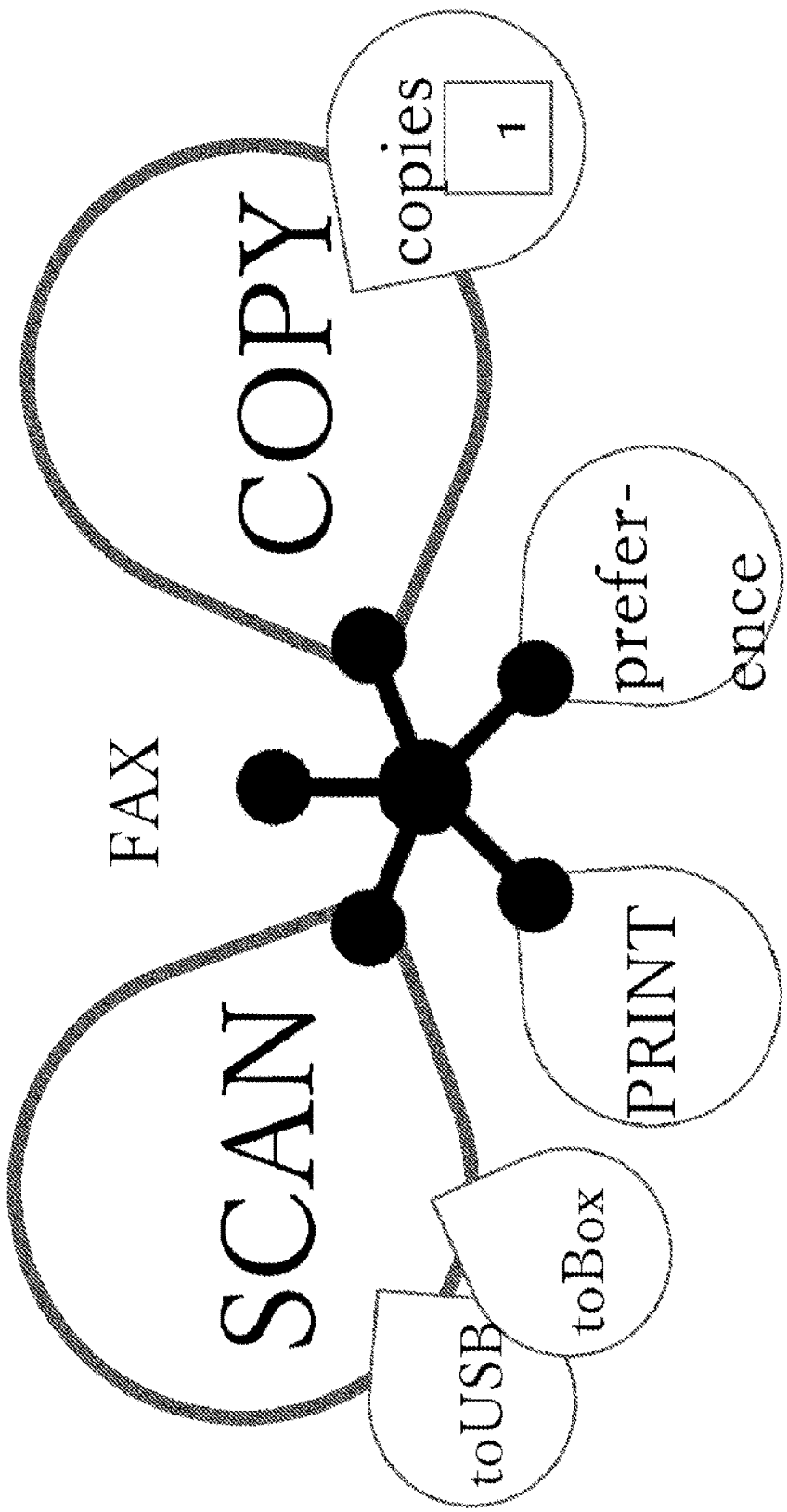
FIG. 4 is an example of a screen in a specific example of the inferred response process illustrated in FIG. 3.

FIG. 4 illustrates a menu screen example 501 at the time of response in this example. The response unit 130 is able to highlight and enlarge portions of a possible menu, and also display submenus and shortcuts. In this example, "COPY" and "SCAN" are highlighted and enlarged. In this way, an easy-to-understand menu screen may be presented to the target operator.

(Private Printing)

For example, the recognizing unit 100 recognizes from the captured image data 200 that the target operator has no portable object.

At this time, the additional information collecting unit 110 acquires, as additional information 220 associated with the target operator, that the job was received immediately before as additional information 220. In this case, the situation inferring unit 120 infers that the target operator is in a situation of coming to retrieve printed matter. In addition, the situation inferring unit 120 also takes into consideration the possibility of a different person from the person outputting the job data.

Furthermore, the recognizing unit 100 may recognize that the target operator has taken out an ID card. In this case, it is presumed that the target operator is trying to perform authentication using the ID card. As a result, the situation inferring unit 120 calculates the possibility of the instruction of the target operator as the above-described score. Furthermore, at this time, when the recognizing unit 100 recognizes that the target operator has come running, the situation inferring unit 120 is also able to adjust the degree of emphasis in the score.

Figure 5:
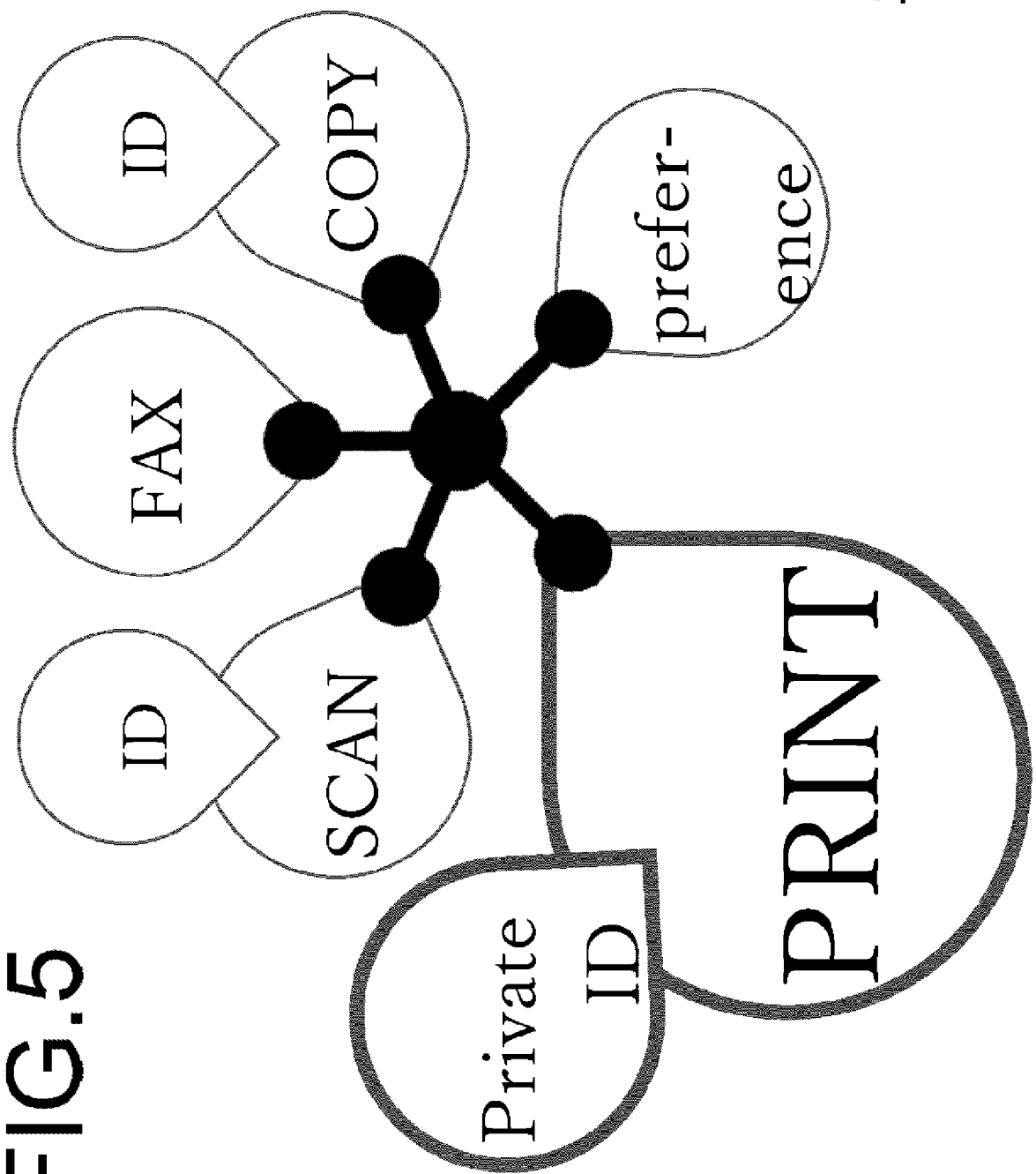
FIG. 5 is an example of a screen in a specific example of the inferred response process illustrated in FIG. 3.

FIG. 5 illustrates a menu screen example 502 at the time of response in this example.

In this example as well, the response unit 130 highlights and enlarges a part of a possible menu corresponding to the score of the possibility of the instruction, and also displays submenus and shortcuts. In this example, "PRINT" is highlighted and enlarged. Furthermore, as a submenu, the portion of "Private ID" of the instruction for reading the user ID is highlighted by a blinking display.

(Emergency Situation)

Moreover, the recognizing unit 100, for example, recognizes from the captured image data 200 a facial expression and gesture of "Whoa!" as a characteristic reaction of the target operator.

As a result, the situation inferring unit 120 infers that the situation may be an emergency.

Accordingly, the response unit 130 temporarily stops the operation of the image forming apparatus 1. Then, the response unit 130 is able to output a voice response such as "Do you have any problems?" or "Operation is temporarily stopped. Operation will restart in xx seconds."

(Other Solutions)

Moreover, for example, the recognizing unit 100 is able to recognize and respond in real time when the target operator intentionally or naturally reacts.

For example, the situation inferring unit 120 is able to infer a situation in which, for example, a target operator decides to make copy and thinks that by just going to the image forming apparatus 1 it will be possible; however, after approaching the image forming apparatus 1, freezes because of not being familiar with how to operate the apparatus or the like, and becomes frustrated because of people lining up behind.

In this case, presuming that a threshold value is not exceeded, the response unit 130 does not need to respond.

However, in this kind of a situation, the recognizing unit 100 may recognize that the target operator has performed an instruction different from the score, and has made an expression, gesture, action, reaction, or the like of surprise.

In this case, the situation inferring unit 120 is able to infer a situation in which the operation is wrong.

Then, the response unit 130 may temporarily stop the operation of the image forming apparatus 1 as described above, and is able to respond with a voice response of "Operation is temporarily stopped due to your surprise."

Then, the response unit 130 responds with a voice response "You have come to copy, right?" and highlights the menu.

In this way, by responding according to the intention of the target operator, it is possible to provide the user with an impressive experience, and operability may be improved.

In addition, it is also possible to reduce the time and effort involved in assisting by other users, and the like lined up behind, and give reassurance such as "The person in front seems to be unfamiliar with the operation, however, does not require help."

With the configuration described above, the following effects may be obtained.

In a typical technique, it is only possible for image recognition to recognize a user's face, and then limit functions and change selection options based on information associated with the face. In other words, only limited processing such as displaying a pre-registered "My Menu" and prohibiting the use of FAX is possible. Therefore, for the user, operability may not be sufficiently improved using a typical technique.

On the other hand, a feature of the image forming apparatus 1 of an embodiment according to the present disclosure is that the image forming apparatus 1 includes: a recognizing unit 100 that recognizes surroundings of the image forming apparatus 1 itself from the image data 200 captured by an image capturing unit 20; a situation inferring unit 120 that infers the situation of the image forming apparatus 1 itself from the recognition information 210 recognized by the recognizing unit 100; and a response unit 130 that changes a responding and/or operation corresponding to the situation inferred by the situation inferring unit 120.

With this kind of configuration, it is possible to improve the operability by inferring the function desired by the target operator.

In addition, a feature of the image forming apparatus 1 of an embodiment according to the present disclosure is that the recognizing unit 100 recognizes any one of a person, a facial expression, a gesture, an action, a reaction, the operation frequency, the moving direction, a portable object, the lined order or any arbitrary combination of these of the target operator.

With such a configuration, clues for making a detailed inference of the current situation of the target operator may be obtained, and it is possible to make an appropriate response. Therefore, it is possible to improve operability.

Moreover, a feature of the image forming apparatus 1 of an embodiment according to the present disclosure is that the image forming apparatus 1 further includes an additional information collecting unit 110 that collects additional information 220 that possibly is associated with the target operator recognized by the recognizing unit 100; wherein, the additional information collecting unit 110 acquires, as the additional information 220, any one or any combination of the apparatus operation history, job reception information, and option mounting state information; and the situation inferring unit 120 infers the situation of the target operator by also using the additional information 220 collected by the additional information collecting unit 110.

With this kind of configuration, further clues for inferring the current situation of the target operator in detail may be obtained from the additional information 220, and it possible to make an appropriate response. Therefore, it is possible to improve operability.

Moreover, a feature of the image forming apparatus 1 of an embodiment according to the present disclosure is that the response unit 130 as a change of the response and/or operation, changes the operation of the image forming apparatus 1 itself, changes the menu, and/or responds by a voice response according to the situation.

With this kind of configuration, it is possible to respond to the target operator in an easy-to-understand manner by changing the menu and/or by a voice response. Therefore, it is possible to improve operability.

Moreover, a feature of the image forming apparatus 1 of an embodiment according to the present disclosure is that the response unit 130 performs a highlight display for enlarging a part of a menu corresponding to a situation.

With this kind of configuration, it is possible to provide an easy-to-understand response according to the intention of the target operator. Furthermore, the menu is not completely changed, so it is possible to indicate to the target operator which operation should be performed in an easy-to-understand manner. Therefore, it is possible to improve operability.

Other Embodiments

Note that, in the embodiments according to the present disclosure, it has been described that an image of the surroundings of the image forming apparatus 1 is captured by the image capturing unit 20 provided in the image forming apparatus 1.

However, the image capturing unit 20 may be a network camera, a monitoring camera, or the like that is able to acquire the image data 200 via a network transmitting/receiving unit 15.

In addition, the recognizing unit 100 may be configured so that recognition of the target operator is performed by using an AI accelerator that is provided in an external server or the like. In other words, configuration is possible in which the image data 200 captured by the image capturing unit 20 may be transmitted to the server to perform at least a part of the recognition by AI.

With this kind of configuration, it is possible to perform the recognition of a target operator according to an embodiment in which an existing image recognitions system is used, making it possible to reduce cost and to reduce the power consumption and the like of the image forming apparatus 1.

In addition, the technique according to the present disclosure may also be applied to information processing apparatuses other than an image forming apparatus. In other words, a configuration is possible in which a server or the like to which a network scanner, or a scanner are separately connected by a USB or the like is used.

Moreover, the configuration and operation of the above embodiments are examples, and needless to say, the configuration and operation may be appropriately changed and executed without departing from the gist of the present disclosure.

What is claimed is:

1. An image forming apparatus, comprising:
a recognizing unit configured to recognize surroundings of the image forming apparatus itself from captured image data, and thereby recognize recognition information from the captured image data;
an additional information collecting unit configured to collect additional information that possibly is associated with a target operator;
a situation inferring unit configured to infer a situation of the image forming apparatus itself by correlating the recognition information recognized by the recognizing unit with the additional information; and
a response unit configured to change a response and/or an operation corresponding to the situation inferred by the situation inferring unit, wherein
the recognition information comprises
recognition that a person around the image forming apparatus itself is the target operator; and
recognition of operation-related information related to user operation by the target operator;
the addition information comprises any one or any combination of apparatus operation history and option mounting state information as the additional information; and
the inferred situation is an inference of an image forming apparatus operation that the target operator will want to perform next.

2. The image forming apparatus according to claim 1, wherein
the response unit
as the change of a response and/or operation, changes an operation of the image forming apparatus itself, changes a menu of the image forming apparatus, and/or responds with a voice response.

3. The image forming apparatus according to claim 2, wherein
the response unit, as the change of a response and/or an operation
dynamically changes, according to the inferred situation, selection options displayed on the image forming apparatus and selectable by a user.

4. The image forming apparatus, according to claim 1, wherein
the addition information comprises apparatus operation history;
the apparatus operation history comprises a history of a function performed by the image forming apparatus;
the situation inferring unit is configured to calculate a score for the situation inferred based on the apparatus operation history; and
the response unit is configured to perform said change of a response and/or an operation when the score exceeds a threshold.

5. The image forming apparatus, according to claim 1, wherein
the addition information comprises apparatus operation history;
the apparatus operation history comprises a history of a function performed by the image forming apparatus;
the situation inferring unit is configured to calculate a score for each of a plurality of situations inferred based on the apparatus operation history, wherein each of the plurality of situations inferred is an inference of an image forming apparatus operation that the user will want to perform next; and
the response unit is configured to perform a change of a response and/or an operation corresponding to a situation, of the plurality of situations, the score of which exceeds a threshold.

6. The image forming apparatus, according to claim 3, wherein the inferred image forming apparatus operation that the target operator will want to perform next is a selection option, and the dynamic change provides the selection option such that it can be selected in a shorter amount of time relative to a menu provided by the image forming apparatus without the dynamic change.

7. The image forming apparatus, according to claim 3, wherein the inferred image forming apparatus operation that the target operator will want to perform next is a selection option, and the dynamic change comprises enlargement of a portion of a display of a menu which provides the selection option.

8. The image forming apparatus, according to claim 3, wherein the inferred image forming apparatus operation that the target operator will want to perform next is a selection option, and the dynamic change comprises display of a shortcut that reduces, relative to the menu, a plurality of operations to one operation.

9. The image forming apparatus, according to claim 3, wherein the inferred image forming apparatus operation that the target operator will want to perform next is a selection option, and the dynamic change comprises display of the selection option, wherein the selection option, when displayed in the absence of the dynamic change, is not present at the top of a hierarchy of the menu.

10. The image forming apparatus, according to claim 1, wherein the captured image data is a wide angle capture.

11. The image forming apparatus, according to claim 1, wherein
the addition information comprises option mounting state information;
the situation inferring unit is configured to calculate a score for the situation inferred based on the option mounting state information; and
the response unit is configured to perform said change of a response and/or an operation when the score exceeds a threshold.

12. An image forming method that is executed by an image forming apparatus comprising the steps of:
in the image forming apparatus,
performing recognition of surroundings of the image forming apparatus itself from captured image data, thereby recognizing recognition information from the captured image data;
collecting additional information that possibly is associated with a target operator
inferring a situation of the image forming apparatus itself by correlating the recognized recognition information with the additional information; and
performing a change of a response and/or an operation corresponding to the inferred situation, wherein
the recognition information comprises
recognition that a person around the image forming apparatus itself is the target operator; and
recognition of operation-related information related to user operation by the target operator;
the addition information comprises any one or any combination of apparatus operation history and option mounting state information as the additional information; and
the inferred situation is an inference of an image forming apparatus operation that the target operator will want to perform next.

13. The image forming method according to claim 12, wherein the method comprises
as the change of the response and/or operation, changing an operation of the image forming apparatus itself, changes a menu of the image forming apparatus, and/or responds with a voice response.

14. The image forming method according to claim 13, wherein the method comprises
as the change of the response and/or an operation, dynamically changing according to the inferred situation, selection options displayed on the image forming apparatus and selectable by a user.

15. A non-transitory computer-readable recording medium including instructions that are executed by an image forming apparatus, the instructions including the steps of:
in the image forming apparatus,
performing recognition of surroundings of the image forming apparatus itself from captured image data, thereby recognizing recognition information from the captured image data;
collecting additional information that possibly is associated with a target operator;
inferring a situation of the image forming apparatus itself by correlating the recognized recognition information with the additional information; and
performing a change of a response and/or an operation corresponding to the inferred situation, wherein
the recognition information comprises
recognition that a person around the image forming apparatus itself is the target operator; and
recognition of operation-related information related to user operation by the target operator;
the addition information comprises any one or any combination of apparatus operation history and option mounting state information as the additional information; and
the inferred situation is an inference of an image forming apparatus operation that the target operator will want to perform next.

16. The recording medium according to claim 15, wherein the instructions include:
as the change of a response and/or an operation, changing an operation of the image forming apparatus itself, changes a menu of the image forming apparatus, and/or responds with a voice response.

17. The recording medium according to claim 16, wherein the instructions include:
as the change of a response and/or an operation, dynamically changing, according to the inferred situation, selection options displayed on the image forming apparatus and selectable by a user.

* * * * *